US010304420B2

(12) United States Patent
Kim

(10) Patent No.: US 10,304,420 B2
(45) Date of Patent: May 28, 2019

(54) ELECTRONIC APPARATUS, IMAGE COMPRESSION METHOD THEREOF, AND NON-TRANSITORY COMPUTER READABLE RECORDING MEDIUM

(71) Applicant: Samsung Electronics Co., Ltd., Suwon-si (KR)

(72) Inventor: In-hwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/659,097

(22) Filed: Jul. 25, 2017

(65) Prior Publication Data

US 2018/0122340 A1 May 3, 2018

(30) Foreign Application Priority Data

Nov. 2, 2016 (KR) ........................ 10-2016-0145313

(51) Int. Cl.

*G06T 9/00* (2006.01)
*G09G 5/393* (2006.01)
*G09G 5/02* (2006.01)

(52) U.S. Cl.

CPC ............. *G09G 5/393* (2013.01); *G09G 5/026* (2013.01); *G09G 2330/10* (2013.01); (Continued)

(58) Field of Classification Search

CPC .... H04N 19/184; H04N 19/13; H04N 19/182; H04N 19/463; H04N 19/105; H04N 19/61; G06T 9/20; G09G 2320/029

See application file for complete search history.

(56) References Cited

U.S. PATENT DOCUMENTS 6,657,567 B2 12/2003 Koyanagi
7,899,262 B2 3/2011 Sugita
(Continued)

FOREIGN PATENT DOCUMENTS

KR 0151021 6/1998
KR 2002-0031103 4/2002
(Continued)

OTHER PUBLICATIONS

"A Lossless Embedded compression Using Significant Bit Truncation for HD Video Coding", Kim, Jaemoon et al. *Institute of Electrical and Electronics Engineers* Transactions on Circuits and Systems for Video Technology, vol. 20, No. 6, Jun. 2010, pp. 848-860.
(Continued)

*Primary Examiner* — Hau H Nguyen
(74) *Attorney, Agent, or Firm* — Staas & Halsey LLP

(57) ABSTRACT

An electronic apparatus, an image compression method thereof, and a non-transitory computer readable medium are provided. The electronic apparatus includes an image inputter configured to receive image data, a memory configured to store data, and a processor configured to convert a pixel value of a frame constituting the image data received by the image inputter to a first data value using a preset algorithm, to determine offset for reducing the number of bits of the first data value based on a range of the converted first data value, to add the determined offset to the first data value to generate a second data value, and to store compressed data formed by compressing the generated second data value in the memory, wherein a header of the compressed data includes information on the number of bits of the second data value and the determined offset.

19 Claims, 8 Drawing Sheets

(52) U.S. Cl.
CPC ..... *G09G 2340/02* (2013.01); *G09G 2340/06* (2013.01); *G09G 2350/00* (2013.01)

(56) References Cited

U.S. PATENT DOCUMENTS

| | | | |
|---|---|---|---|
| 2015/0062202 A1 | 3/2015 | Lu | |
| 2016/0021379 A1 | 1/2016 | Minezawa et al. | |
| 2016/0057440 A1 | 2/2016 | Jeong et al. | |
| 2016/0249064 A1* | 8/2016 | Sicard | H04N 19/179 |

FOREIGN PATENT DOCUMENTS

| | | |
|---|---|---|
| KR | 10-2008-0004411 | 1/2008 |
| KR | 10-2015-0069038 | 6/2015 |
| KR | 10-2016-0016836 | 2/2016 |

OTHER PUBLICATIONS

"A Lossless Embedded compression Using Significant Bit Truncation for HD Video Coding", Kim, Jaemoon et al. *Institute of Electrical and Electronics Engineers* vol. 20, No. 6, Jun. 2010, pp. 848-860.

* cited by examiner

FIG. 3

ORIGINAL

| | | | |
|---|---|---|---|
| 30 | 32 | 35 | 33 |
| 35 | 32 | 32 | 33 |
| 38 | 37 | 33 | 33 |
| 42 | 39 | 41 | 39 |

→

PREDICTED

| | | | |
|---|---|---|---|
| 30 | 30 | 32 | 35 |
| 30 | 33 | 33 | 32 |
| 35 | 35 | 34 | 33 |
| 38 | 39 | 36 | 37 |

FIG. 4

PREDICTION ERROR
(FIRST DATA)

| | | | |
|---|---|---|---|
| 0 | 2 | 3 | -2 |
| 5 | -1 | -1 | 1 |
| 3 | 2 | -1 | 0 |
| 4 | 0 | 5 | 2 |

ELECTRONIC APPARATUS, IMAGE COMPRESSION METHOD THEREOF, AND NON-TRANSITORY COMPUTER READABLE RECORDING MEDIUM

CROSS-REFERENCE TO RELATED APPLICATIONS

This application claims priority from Korean Patent Application No. 10-2016-0145313, filed on Nov. 2, 2016, in the Korean Intellectual Property Office, the disclosure of which is incorporated herein by reference in its entirety.

BACKGROUND

Field

Apparatuses and methods consistent with the present disclosure relate to an electronic apparatus, an image compression method thereof, and a non-transitory computer readable medium, and more particularly, an electronic apparatus, an image compression method thereof, and a non-transitory computer readable medium, for enhancing compressibility without increase in a processing cycle.

Description of the Related Art

Due to development of imaging technology, image data has also been rapidly increasing in (bit) size. Accordingly, compression technology of image data has been necessarily used. For example, an electronic apparatus is capable of receiving image data compressed using a codec, such as high efficiency video coding (HEVC) received from an external source.

An electronic apparatus needs to transmit restored image data to an internal IP or components such as a graphic processing unit (GPU) for image processing and so on. The electronic apparatus needs to compress the image data in order to reduce a used bandwidth even when image data is internally transmitted. For example, a compression algorithm such as legacy significant bit truncation (STB) method may be used to compress image data.

However, the STB does not use any index to be represented by a bit length header (BLH). In addition, there is a problem in that the number of bits for representation of a pixel value is increased depending on a difference between pixel values in a pixel group that is a compression target.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides an electronic apparatus, an image compression method thereof, and a non-transitory computer readable medium, for determining offset for enhancing compressibility according to a range of pixel values and transmitting an offset value using a non-used index of a bit length header (BLH).

According to an aspect of the present disclosure, an electronic apparatus includes an image inputter configured to receive image data, a memory configured to store data, and a processor configured to convert a pixel value of a frame constituting the image data received by the image inputter to a first data value using a preset algorithm, to determine offset for reducing the number of bits of the first data value based on a range of the converted first data value, to add the determined offset to the first data value to generate a second data value, and to store compressed data formed by compressing the generated second data value in the memory, wherein a header of the compressed data includes information on the number of bits of the second data value and the determined offset.

The number of bits of the second data value may be less than the number of bits of the first data value.

The memory may store an index table including settable offsets corresponding to a range of the first data value and the number of stream bits of image data and the processor may search the stored index table and determine offset for reducing the number of bits of the first data value among the settable offsets.

The number of settable offsets may be determined depending on the number of stream bits of the image data.

The header may include an index value indicating offset information and the number of bits of the second data value.

The processor may compress the second data value using a lossless compression algorithm.

The lossless compression algorithm may delete a redundant bit header of the generated second data value and attach a header including the number of bits of the generated second data value and information on the determined offset to compress the generated second data value.

The processor may determine a prediction pixel value of each of pixel values of a frame constituting the received image data based on a neighboring pixel value and subtract the determined prediction pixel value from the pixel value of the frame constituting the received image data to convert the pixel value to the first data value.

The electronic apparatus may further include a buffer configured to store the image data received by the image inputter, wherein the processor may divide and receive the image data stored in the buffer in a preset unit.

According to another aspect of the present disclosure, an image compression method of an electronic apparatus includes receiving image data, converting a pixel value of a frame constituting the received image data to a first data value using a preset algorithm, determining offset for reducing the number of bits of the first data value based on a range of the converted first data value, adding the determined offset to the first data value to generate a second data value, and generating and storing compressed data formed by compressing the generated second data value, wherein a header of the compressed data includes information on the number of bits of the second data value and the determined offset.

The number of bits of the second data value may be less than the number of bits of the first data value.

The method may further include storing an index table including settable offsets corresponding to a range of the first data value and the number of stream bits of image data, wherein the determining of the offset may include searching the stored index table and determining offset for reducing the number of bits of the first data value among the settable offsets.

The number of settable offsets may be determined depending on the number of stream bits of the image data.

The header may include an index value indicating offset information and the number of bits of the second data value.

The generating and storing of the compressed data may include compressing the second data value using a lossless compression algorithm.

The lossless compression algorithm may delete a redundant bit header of the generated second data value and attach a header including the number of bits of the generated second data value and information on the determined offset to compress the generated second data value.

The converting of the first data value may include determining a prediction pixel value of each of pixel values of a frame constituting the received image data based on a neighboring pixel value, and subtracting the determined prediction pixel value from the pixel value of the frame constituting the received image data to convert the pixel value to the first data value.

The receiving of the image data may include storing the received image data in a buffer, and dividing and receiving the image data stored in the buffer in a preset unit.

According to another aspect of the present disclosure, a non-transitory computer readable medium has recorded thereon a program for executing an image compression method of an electronic apparatus, the method including receiving image data, converting a pixel value of a frame constituting the received image data to a first data value using a preset algorithm, determining offset for reducing the number of bits of the first data value based on a range of the converted first data value, adding the determined offset to the first data value to generate a second data value, and generating and storing compressed data formed by compressing the generated second data value, wherein a header of the compressed data includes information on the number of bits of the second data value and the determined offset.

According to the diverse exemplary embodiments of the present disclosure, compressibility may be enhanced using offset and offset information may be stored using a non-used index of a bit length header (BLH) and, accordingly, compressibility may be enhanced without increase in a processing cycle.

Additional and/or other aspects and advantages of the embodiments will be set forth in part in the description which follows and, in part, will be obvious from the description, or may be learned by practice of the embodiments.

BRIEF DESCRIPTION OF THE DRAWING FIGURES

The above and/or other aspects of the present disclosure will be more apparent by describing certain exemplary embodiments of the present disclosure with reference to the accompanying drawings, in which:

FIGS. 3 and 4 are diagrams for explanation of a method of generating first data according to an exemplary embodiment of the present disclosure;

DETAILED DESCRIPTION OF THE EXEMPLARY EMBODIMENTS

Certain exemplary embodiments of the present disclosure will now be described in greater detail with reference to the accompanying drawings. In the following description of the present disclosure, a detailed description of known functions and configurations incorporated herein will be omitted when it may make the subject matter of the present disclosure unclear. The terms used in the specification are defined in consideration of functions used in the present disclosure, and may be changed according to the intent or conventionally used methods of clients, operators, and users. Accordingly, definitions of the terms should be understood on the basis of the entire description of the present specification.

It will be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present disclosure. As used herein, the term "and/or" includes any and all combinations of one or more of the associated listed items.

The terminology used herein is for the purpose of describing particular embodiments only and is not intended to be limiting of the inventive concept. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

In exemplary embodiments of the present disclosure, the terms, such as 'unit' or 'module', etc., should be understood as a unit that processes at least one function or operation and that may be embodied in a hardware manner, a software manner, or a combination of the hardware manner and the software manner. In addition, a plurality of 'modules' or a plurality of 'units' may be integrated into at least one module to be embodied as at least one processor except for a 'module' or a 'unit' that needs to be embodied as a specific hardware.

Hereinafter, the present disclosure will be described in greater detail with reference to the accompanying drawings.

Figure 1:
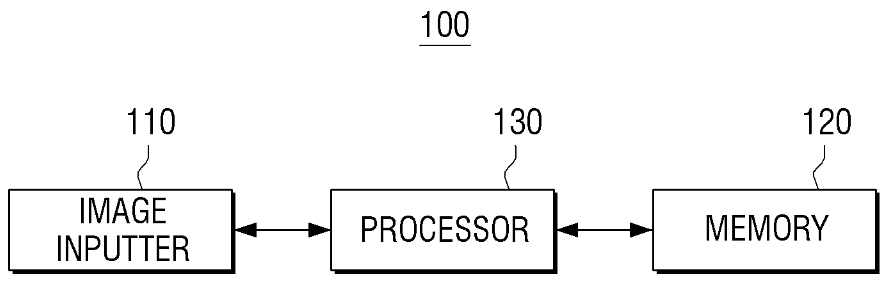
FIG. 1 is a schematic block diagram for explanation of a configuration of an electronic apparatus according to an exemplary embodiment of the present disclosure.

FIG. 1 is a schematic block diagram for explanation of a configuration of an electronic apparatus 100 according to an exemplary embodiment of the present disclosure. Referring to FIG. 1, the electronic apparatus 100 may include an image inputter 110, a memory 120, and a processor 130.

The image inputter 110 may receive image data from various sources. For example, the image inputter 110 may receive broadcast data from an external broadcaster. As another example, the image inputter 110 may receive image data from an external device (e.g., set-top box and DVD player) or receive image data from an external server via streaming.

The memory 120 may store data used in the electronic apparatus 100. For example, the memory 120 may store image data compressed by the processor 130. In addition, the memory 120 may store various modules, software, and data for driving the electronic apparatus 100.

The processor 130 may control overall configuration of the electronic apparatus 100. For example, the processor 130 may compress image data, store the image data in the memory 120, read the compressed image data from the memory 120, and restore the image data. The processor 130 may be embodied as a single central processing unit (CPU) so as to perform a control operation, a compression/decompression operation, and so on or may be configured with a plurality of processors, an IP for performing a specific function, and a circuit.

According to an exemplary embodiment of the present disclosure, the processor 130 may compress and store a pixel value of a frame constituting the received image data. The processor 130 may generate a prediction pixel value of a pixel value of the received image data. The processor 130 may subtract a prediction pixel value from an original pixel value of the received image data to generate a first data value. For example, the first data value may be represented according to two's complement representation.

The processor 130 may determine offset for achieving an effect of reducing the number of bits of compressed data when the offset is added to the first data value. A method of determining offset will be described below in detail.

The processor 130 may add the determined offset to first data value to generate a second data value. The processor 130 may compress the second data value and attach a bit length header (BLH) thereto to generate compressed data. The number of bits of the second data value (which is the number of bits for representing the second data value) is less than the number of bits of the first data and, thus, the processor 130 may achieve an effect of additional compression due to reduction in the number of bits compared with an existing compression effect.

A BLH may contain information on a bit length and an offset value. The processor 130 may map information on the offset value to a non-used index of the BLH and transmit the result. Accordingly, the BLH may also include additional information without increase in the number of bits of the BLH.

The processor 130 may apply the aforementioned compression operation in reverse order to restore the compressed data to original image data. A restoration method will be described below in detail.

Figure 2:
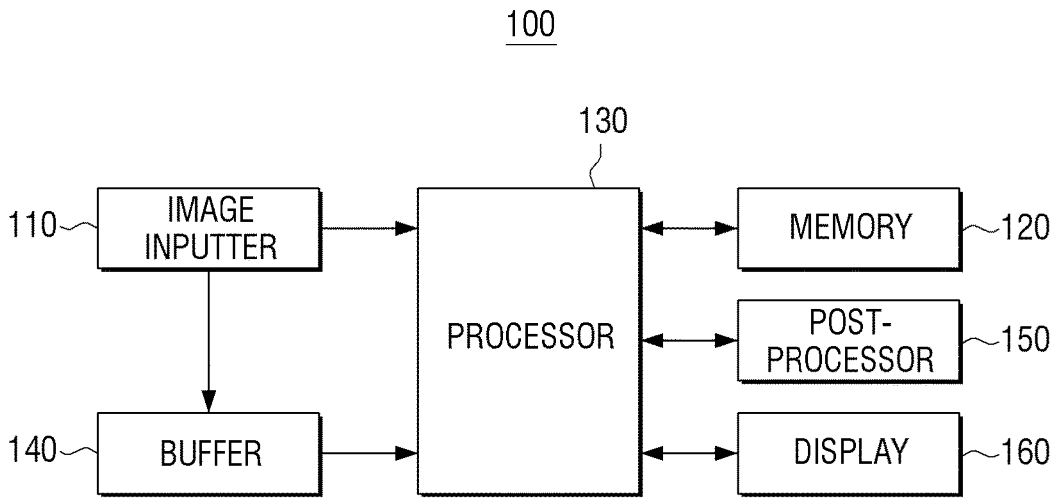
FIG. 2 is a block diagram for detailed explanation of a configuration of an electronic apparatus according to an exemplary embodiment of the present disclosure.

FIG. 2 is a block diagram for detailed explanation of a configuration of the electronic apparatus 100 according to an exemplary embodiment of the present disclosure. Referring to FIG. 2, the electronic apparatus 100 may include the image inputter 110, the memory 120, the processor 130, a buffer 140, a post-processor 150, and a display 160. The exemplary embodiment of FIG. 2 is merely an example of the present disclosure and may include additional components such as a user inputter (not shown) and a communicator (not shown). Some components illustrated in FIG. 2 may be omitted or some components may perform functions of other components.

The image inputter 110 may receive image data from various sources. The image inputter 110 may temporally store the received image data in the buffer 140 that will be described below. For example, the image inputter 110 may receive image data of YUV format. The YUV format may include Y data for representation of shading and U and V data for representation of color. The image data may be divided into pixel regions for representation of Y, U, and V.

The memory 120 may store various programs and data required for an operation of the electronic apparatus 100. For example, the memory 120 may store image data compressed by the processor 130. The memory 120 may store an index table including settable offsets corresponding to a range of a converted pixel value and the number of stream bits of the image data. The index table may be obtained by mapping a bit length and an offset value to indexes of a BLH.

In addition, the memory 120 may store various modules, software, and data for driving the electronic apparatus 100. For example, the memory 120 may store compression/decompression application. The compression/decompression application may be a computer or application that is driven by the processor 130 and contains commands for compression/decompression of image data.

The memory 120 may be embodiment in the form of a flash memory, a hard disk, or the like. For example, the memory 120 may include a read only memory (ROM) for storing a program for performing an operation of the electronic apparatus 100, a random access memory (RAM) for temporally storing data in response to an operation of the electronic apparatus 100, and so on. In addition, the memory 120 may further include an electrically erasable and programmable ROM (EEPROM), etc. for storing various reference data.

The buffer 140 may store the received image data in the image inputter 110. The processor 130 may divide and receive the image data stored in the buffer 140 in a preset unit. The buffer 140 may be a temporal storage space used to transmit and receive data between components with different data processing speeds, processing units, etc. For example, the processor 130 may divide and read the image data stored in the buffer 140 in a data size unit for processing image compression at one time.

The post-processor 150 may post-process the image data restored by the processor 130. For example, the post-processor 150 may perform various image processing operations such as scaling, noise filtering, frame rate conversion, and resolution conversion on the restored image data.

The display 160 may display the image data image-processed by the post-processor 150. The display 160 may display a user interface window and so on provided by the electronic apparatus 100. For example, the user interface window may include a guidance message, a notification message, a function setting menu, an operation execution button, and so on. The display 160 may be embodied in various forms such as a liquid crystal display (LCD), an organic light emitting diode (OLED), an active-matrix organic light-emitting diode (AM-OLED), and a plasma display panel (PDP).

Hereinafter, an operation of the processor 130 will be described in more detail with reference to the accompanying drawings. Hereinafter, image data is assumed to be data of YUV format. However, format of the image data is not limited to YUV format.

The YUV format is configured with Y data for representation of shading and U and V data for representation of color. U indicates a blue color component in shading and V indicates a red color component in shading and, accordingly, U and V may also be denoted by Cb and Cr, respectively. The image data Image data may be divided into pixel regions that represent Y, U, and V, respectively. For example, in the case of YUV 420 format, when Y is presented in 4 bytes, U and V may each be presented in 1 byte. In addition, 4 Y pixel values may be configured to share pixel values of U and V.

According to an exemplary embodiment of the present disclosure, the electronic apparatus 100 may divide image data into regions of YUV and perform compression on pixel values of each region. For example, a pixel of a 4×4 size of FIG. 3 may correspond to a portion of one pixel region of Y, U, and V.

The processor 130 may convert a pixel value of a frame constituting original image data received by the image inputter 110 or the buffer 140 into a first data value using a preset algorithm. For example, the processor 130 may determine a prediction pixel value of each pixel value of the original image data via spatial prediction using a neighboring pixel value. The processor 130 may subtract the prediction pixel value from a pixel value of the original image data to generate the first data value. The first data value may also be referred to as a prediction error value.

The processor 130 may reduce an absolute value of data indicating a pixel value through this procedure. With reference to FIGS. 3 and 4, the aforementioned procedure of generating first data will be described in detail.

A 4×4 pixel value shown in a left side of FIG. 3 may be a pixel value of a region of a frame constituting image data. A pixel value may be represented as a value of 0 to 255. The processor 130 may determine a prediction pixel value of an original pixel value using various preset algorithms. An algorithm applied in FIG. 3, which will be described below, is merely an embodiment and the prediction pixel value is not necessarily determined using the algorithm to be described below.

The processor 130 may determine a pixel value positioned in an upper-left side of a pixel unit (e.g., 4×4) for image processing as a base pixel value. The determined base pixel value may be used to subsequently restore image data. The processor 130 may store the base pixel value along with the compressed image data in the memory 120.

In the example of FIG. 3, the processor 130 may determine a value 30 of an upper-left pixel as a base pixel value. The processor 130 may first determine prediction pixel values of an uppermost row and a leftmost column. For example, in the case of an uppermost row, the processor 130 may determine an original pixel value 30 of a pixel positioned at (1, 1) as a prediction pixel value of a pixel positioned at (1, 2). The processor 130 may determine an original pixel value 32 of a pixel positioned at (1, 2) as a prediction pixel value of a pixel positioned at (1, 3). Through this procedure, the processor 130 may determine prediction pixel values of an uppermost row and a leftmost column.

Then, the processor 130 may determine prediction pixel values of the remaining pixels. The processor 130 may determine an average value (which is obtained by rounding down a value to the nearest integer) of two pixel values positioned in upper and left sides of a prediction target pixel as a prediction pixel value of the prediction target pixel. For example, in the case of a (2, 2) pixel, the processor 130 may determine an average value 33 of an original pixel value 32 of a (1, 2) pixel of an upper side and an original pixel value 35 of a (2, 1) pixel of a left side as a prediction pixel value of a (2, 2) pixel.

The processor 130 may determine a prediction pixel value of an original pixel value using the aforementioned algorithm according to an exemplary embodiment of the present disclosure. A prediction pixel value of the original pixel value shown in a left portion of FIG. 3 is illustrated in a right portion.

The processor 130 may subtract the prediction pixel value from the original pixel value and convert the result into a first data value (or prediction error value) shown in FIG. 4. The subtracted pixel value shown in FIG. 4 is configured with values close to 0 and, accordingly, the processor 130 may reduce an absolute value of pixel data.

The processor 130 may divide and use the first data value into a preset size in order to increase efficiency of image compression processing. For example, the processor 130 may perform image compression in a pixel region unit of a 4×2 size. The following description will be given using [3, 2, −1, 0, 4, 0, 5, 2] that is a 4×2 region of a lower side of FIG. 4.

Figure 5:
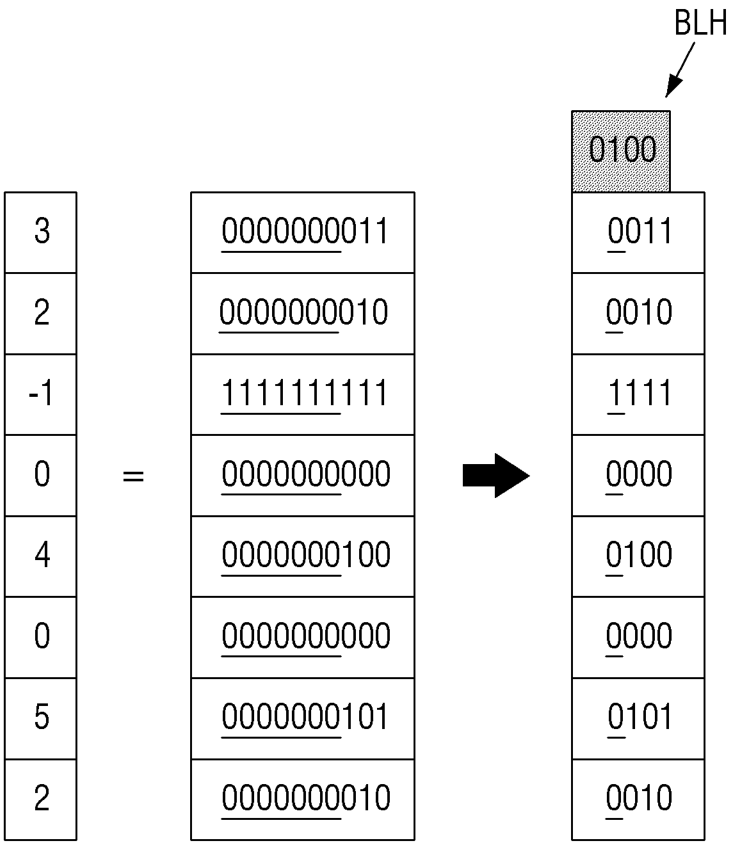
FIG. 5 is a diagram illustrating the case in which offset is not applied according to an exemplary embodiment of the present disclosure.

FIG. 5 is a diagram illustrating the case in which offset is not applied according to an exemplary embodiment of the present disclosure. The processor 130 may compress data using a lossless compression algorithm. A loss compression algorithm spreads an error value via each operation and, accordingly, is not appropriate to be used for image data. Hereinafter, a method of compressing pixel data will be described using an example of a lossless compression algorithm.

Referring to FIG. 5, the processor 130 may represent the first data value according to two's complement representation. The two's complement representation may refer to a method of representing a positive value as a binary number and representing a negative value as a two's complement value of a binary value. For example, two's complement representation of 3 may be 0000000011 for representing 3 in a binary number. As another example, two's complement representation of −1 may be 1111111111 that is two's complement of 0000000001 obtained by representing 1 in a binary number. In the embodiment of FIG. 5, an image data stream is assumed to have 10 bits and, accordingly, a length of a value obtained by representing each pixel value according to two's complement representation is 10.

The processor 130 may determine the number of bits required to identify each pixel values. In the example of FIG. 5, the processor 130 may identify a pixel value when only last four bits are presented. The processor 130 may delete a redundant bit header and compress a pixel value.

The processor 130 may pack a bit length header (BLH) in a header of compressed image data in order to indicate the number of significant bits from which redundant bits are excluded. As seen from the example of FIG. 5, a BLH with an index of 0100 for representation of the number of significant bits, 4 may be packed.

As such, the processor 130 may delete redundant bits and compress a pixel value. However, an additional compression effect may be obtained using a method of applying offset, which will be described below.

Figure 6:
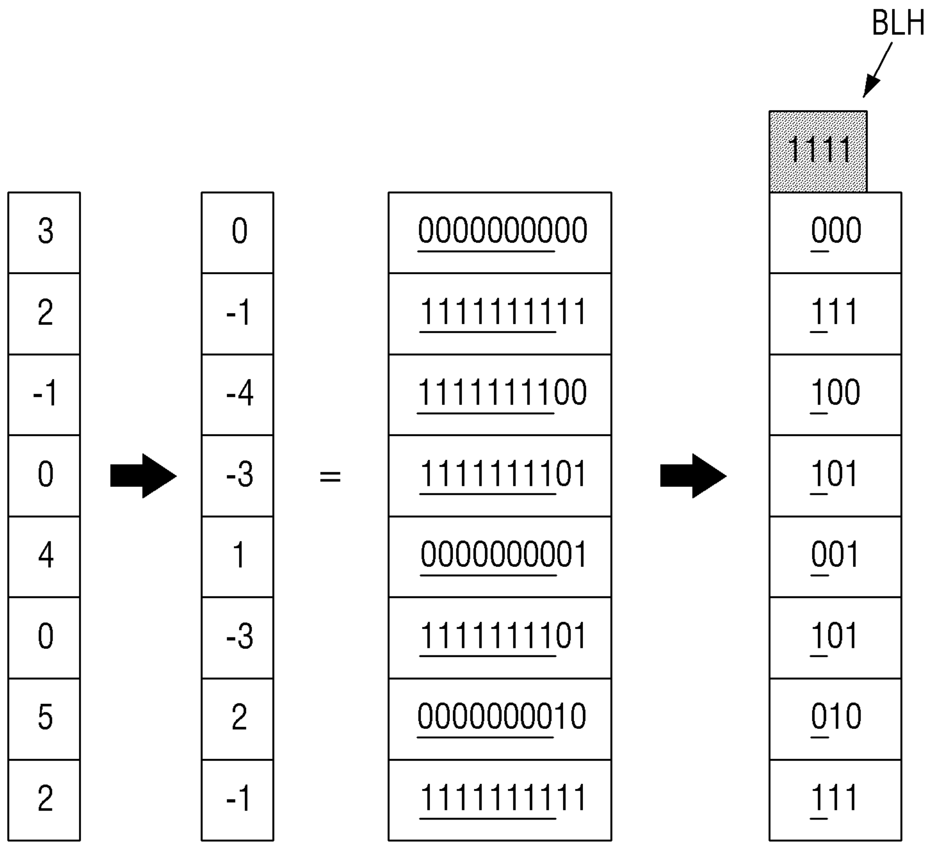
FIG. 6 is a diagram illustrating the case in which offset is applied according to an exemplary embodiment of the present disclosure.

FIG. 6 is a diagram illustrating the case in which offset is applied according to an exemplary embodiment of the present disclosure. With reference to FIG. 6, a method of determining offset, a method of applying offset, and a method of delivering offset information in a bit length header (BLH) will be described.

The processor 130 may determine offset for reducing the number of bits of a first data value based on a range of the first data. The processor 130 may detect a maximum value and a minimum value of the first data and determine the range of the first data. The processor 130 may search for offset corresponding to the range of the first data in an index table and determine the range of the first data. The index table may be a mapping table containing settable offsets corresponding to the range of the first data value and the number of stream bits of image data. The processor 130 may pre-determine optimum offset depending on the range of each first data value using a data compression result and so on and determine the optimum offset in the mapping table.

The number of settable offsets to be stored in the mapping table may be determined depending on the number of steam bits of the image data. According to an exemplary embodiment of the present disclosure, this is because offset information is mapped to a non-used index of a BLH. The number of bits of the BLH may be fixed. For example, in FIGS. 5 and 6, a BLH has a fixed number of 4 bits.

When the number of 4 bits is used, a BLH may include an index of 0 to 15. In addition, an index for representing the number of significant bits may be mapped by the number of stream bits of image data. For example, in the case of a 10-bit data stream, an index of 0 to 9 of a bit length header (BLH) may be used to map the number of significant bits of 1 to 10. In addition, an index of 10 to 15 corresponds to a non-used index. The processor 130 may simultaneously map the number of significant bits and offset to the non-used index. Accordingly, according to the present disclosure, offset information may be stored without increase in data size.

In the example of FIG. 6, the processor 130 may determine a range of a first data value using a maximum value 5 and a minimum value −1 of the first data value. In addition, the processor 130 may determine an offset value for reducing the number of significant bits. The offset may be a value that is converted into values closer to 0 upon being added to the first data value. In the example of FIG. 6, the processor 130 may determine offset as −3.

The processor 130 may add offset to the first data value to generate a second data value. In FIG. 6, when [0, −1, −4, −3, 1, −3, 1, −3, 2, −1] as a second data value is represented according to two's complement representation using the aforementioned compression algorithm, a pixel value may be identified using only three significant bits. That is, the processor 130 may apply offset to generate the second data value with a smaller number of bits than the number of bits of the first data value.

The processor 130 may delete a redundant bit header of the generated second data value and compress image data. In the example of FIG. 6, the processor 130 may identify a pixel value when only last three bits are presented. The processor 130 may delete a redundant bit header and compress a pixel value.

The processor 130 may pack the number of bits of the second data value and the determined offset in a bit length header (BLH). In the example of FIG. 6, information indicating that the number of significant bits is 3 and offset is −3 may be mapped to 1111 that is a non-used index of the BLH.

Compared with the example of FIG. 5 in which offset is not applied, 1 bit is less used to represent each pixel value in the example of FIG. 6 in which offset is applied. As such, the processor 130 may apply an appropriate offset depending on a range of a first data value to further enhance compression efficiency.

Figure 7:
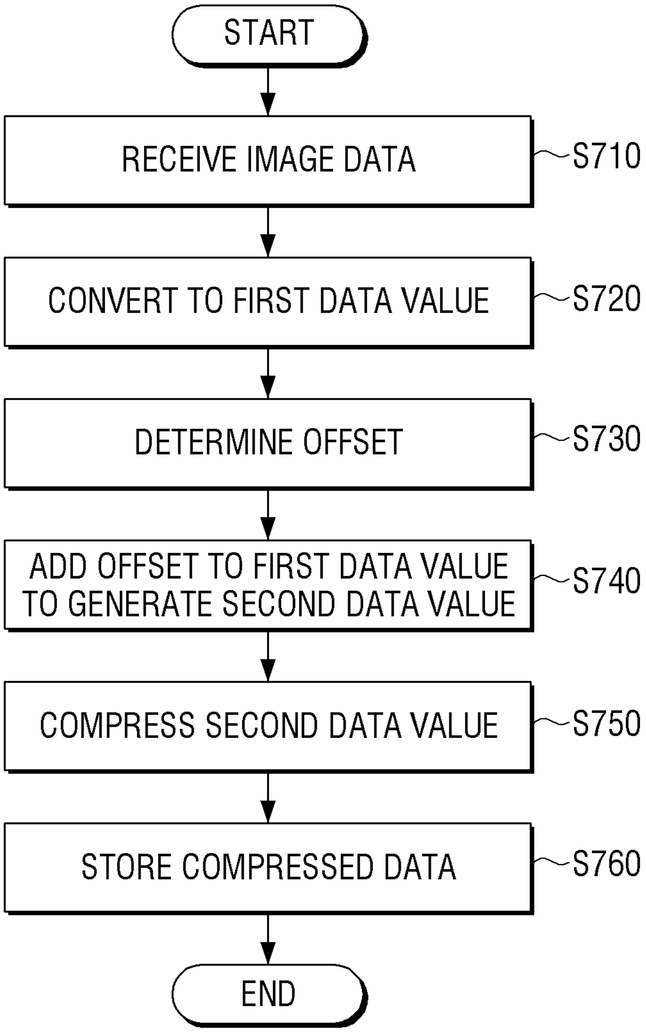
FIG. 7 is a flowchart for explanation of an image compression method of an electronic apparatus according to an exemplary embodiment of the present disclosure.

FIG. 7 is a flowchart for explanation of an image compression method of the electronic apparatus 100 according to an exemplary embodiment of the present disclosure. First, the electronic apparatus 100 may receive image data from an external source (S710). In addition, the electronic apparatus 100 may compress a pixel value of each frame of the received image data. The electronic apparatus 100 may perform compression all pixel regions of Y, U, and V data in image data of YUV format.

The electronic apparatus 100 may convert a pixel value of a frame constituting the received image data into a first data value using a preset algorithm (S720). In detail, the electronic apparatus 100 may determine a prediction pixel value of each pixel value based on a neighboring pixel value. The electronic apparatus 100 may subtract the prediction pixel value from an original pixel value of the received image data to obtain the first data value. The first data value is configured with values close to 0 compared with the original pixel value and, accordingly, the electronic apparatus 100 may reduce an absolute value of pixel data.

The electronic apparatus 100 may determine offset for reducing the number of bits of the first data value based on a range of the first data value (S730). For example, the electronic apparatus 100 may determine the range using a maximum/minimum value of the first data value and search for a predetermined offset value in response to the determined range. Then, the electronic apparatus 100 may add the offset to the first data value to generate a second data value (S740). The generated second data value is configured with values close ( ) compared with the first data value, achieving an effect of reducing the number of significant bits required to identify and represent each pixel value.

The electronic apparatus 100 may compress the second data value to generate compressed data (S750). The electronic apparatus 100 may store the generated compressed data in a memory (S760). In detail, the electronic apparatus 100 may delete a redundant bit header that is not required to identify each value from the second data value. The electronic apparatus 100 may map the number of significant bits and offset information to a non-used index of a bit length header (BLH). Accordingly, the electronic apparatus 100 may add the offset information without change in BLH size. Even if an effect of reducing the number of significant bits is obtained using offset, the electronic apparatus 100 may enhance compressibility compared with the conventional technology in that a size of a BLH is maintained.

Figure 8:
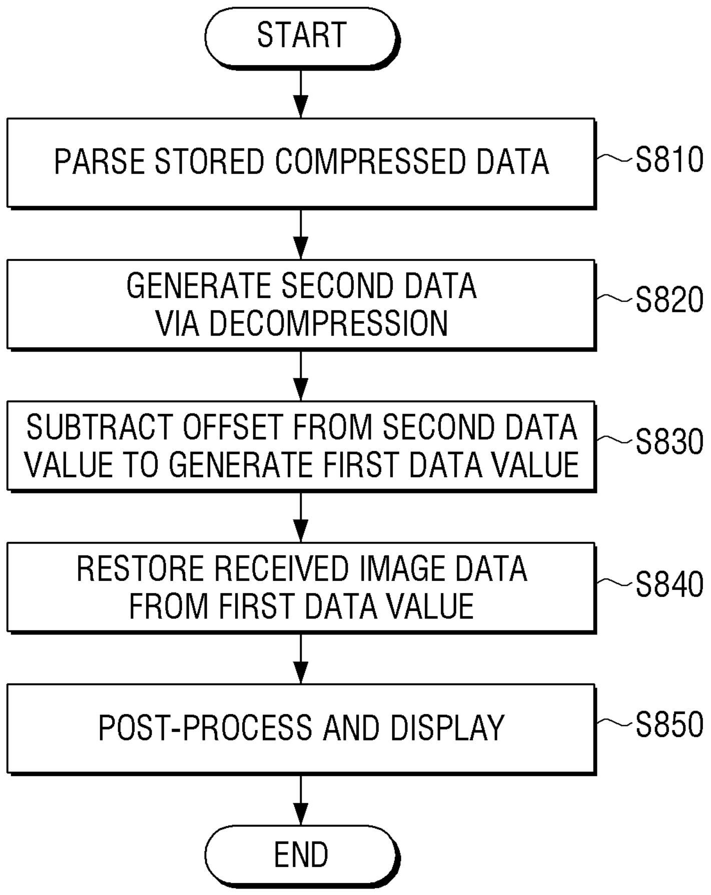
FIG. 8 is a flowchart for explanation of an image restoration method of an electronic apparatus according to an exemplary embodiment of the present disclosure.

FIG. 8 is a flowchart for explanation of an image restoration method of the electronic apparatus 100 according to an exemplary embodiment of the present disclosure. The electronic apparatus 100 may apply the aforementioned compression method to the compressed data in reverse order to restore original image data.

First, the electronic apparatus 100 may parse compressed data stored in a memory by a predetermined number of significant bits (S810). The number of significant bits (the number of bits of the second data value) is contained in a BLH and, accordingly, the electronic apparatus 100 may parse data to be restored by the number of significant bits.

The electronic apparatus 100 may decompress the parsed data to generate second data (S820). For example, the electronic apparatus 100 may extend a redundant bit header to data compressed to 3 bits and convert the compressed data to original 10-bit data. The electronic apparatus 100 may subtract an offset value stored in a BLH from the second data value to generate the first data value (S830).

The electronic apparatus 100 may restore the received image data from the first data value (S840). The electronic apparatus 100 may restore the original pixel value using the first data value and a base pixel value stored during a compression procedure. According to an algorithm type, the electronic apparatus 100 may simultaneously restore an original pixel value and a prediction pixel value using the first data value and the stored base pixel value. In addition, the electronic apparatus 100 may post-process and display the restored image data (S850).

According to the diverse exemplary embodiments of the present disclosure, offset for reducing the number of significant bits may be determined and the determined offset may be stored in a non-used portion of a BLH, thereby achieving an effect of enhancing compressibility compared with the case in which offset is not used.

The aforementioned methods may include a non-transitory computer readable medium including program commands for executing operations implemented through various computers. The non-transitory computer readable medium may store program commands, data files, data structures or combinations thereof. The program commands recorded in the medium may be specially designed and configured for the present disclosure or be known to those skilled in the field of computer software. Examples of a computer readable recording medium include magnetic media such as hard discs, floppy discs and magnetic tapes, optical media such as CD-ROMs and DVDs, magneto-optical media such as optical disks, or hardware devices such as ROMs, RAMs and flash memories, which are specially configured to store and execute program commands. Examples of the program commands include a machine language code created by a compiler and a high-level language code executable by a computer using an interpreter and the like. The hardware device may be configured to operate as at least one software module in order to perform an operation according to the present disclosure or vice versa.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. An electronic apparatus, comprising:
- an image inputter;
- a memory; and
- a processor configured to:
  - convert a pixel value of a frame constituting image data received by the image inputter to a first data value based on a predetermined algorithm,
  - identify an offset for reducing a number of bits of the first data value based on a first range of a converted first data value,
  - add the offset to the first data value to obtain a second data value, and
  - control the memory to store compressed data formed by compressing the second data value,
  - wherein the processor is configured to map a number of bits of the second data value and the offset to a non-used index of a header of the compressed data.

2. The electronic apparatus as claimed in claim 1, wherein the number of bits of the second data value is less than the number of bits of the first data value.

3. The electronic apparatus as claimed in claim 1, wherein:
- the memory stores an index table comprising settable offsets corresponding to a second range of the first data value and a number of stream bits of the image data; and
- the processor searches the index table and identifies the offset for reducing the number of bits of the first data value from among the settable offsets.

4. The electronic apparatus as claimed in claim 3, wherein a number of settable offsets is identified depending on the number of stream bits of the image data.

5. The electronic apparatus as claimed in claim 1, wherein the header comprises an index value indicating offset information and the number of bits of the second data value.

6. The electronic apparatus as claimed in claim 1, wherein the processor compresses the second data value using a lossless compression algorithm.

7. The electronic apparatus as claimed in claim 6, wherein the lossless compression algorithm deletes a redundant bit header of the second data value and attaches another header comprising the number of bits of the obtained second data value and information on the offset to compress the obtained second data value.

8. The electronic apparatus as claimed in claim 1, wherein the processor identifies a prediction pixel value for each pixel value of a frame constituting the received image data based on a neighboring pixel value and subtracts the prediction pixel value from the pixel value of the frame constituting the received image data to convert the pixel value to the first data value.

9. The electronic apparatus as claimed in claim 1, further comprising a buffer configured to store the image data received by the image inputter,
- wherein the processor divides and receives the image data stored in the buffer in a predetermined unit.

10. An image compression method of an electronic apparatus, the method comprising:
- receiving image data;
- converting a pixel value of a frame constituting the received image data to a first data value based on a predetermined algorithm;
- identifying an offset for reducing a number of bits of the first data value based on a first range of a converted first data value;
- adding the offset to the first data value to obtain a second data value;
- obtaining and storing compressed data formed by compressing the second data value; and
- mapping a number of bits of the second data value and the offset to a non-used index of a header of the compressed data.

11. The method as claimed in claim 10, wherein the number of bits of the second data value is less than the number of bits of the first data value.

12. The method as claimed in claim 10, further comprising storing an index table comprising settable offsets corresponding to a second range of the first data value and a number of stream bits of the image data,
- wherein the identifying of the offset comprises searching the stored index table and identifying the offset for reducing the number of bits of the first data value from among the settable offsets.

13. The method as claimed in claim 12, wherein a number of settable offsets is identified depending on the number of stream bits of the image data.

14. The method as claimed in claim 10, wherein the header comprises an index value indicating offset information and the number of bits of the second data value.

15. The method as claimed in claim 10, wherein the obtaining and storing of the compressed data comprises compressing the second data value using a lossless compression algorithm.

16. The method as claimed in claim 15, wherein the lossless compression algorithm deletes a redundant bit header of the obtained second data value and attaches another header comprising the number of bits of the obtained second data value and information on the offset to compress the obtained second data value.

17. The method as claimed in claim 10, wherein the converting of the first data value comprises:

identifying a prediction pixel value for each pixel value of a frame constituting the received image data based on a neighboring pixel value; and subtracting the prediction pixel value from the pixel value of the frame constituting the received image data to convert the pixel value to the first data value.

18. The method as claimed in claim 10, wherein the receiving of the image data comprises:

storing the received image data in a buffer; and dividing and receiving the image data stored in the buffer in a predetermined unit.

19. A non-transitory computer readable medium having recorded thereon a program for executing an image compression method of an electronic apparatus, the method comprising:

receiving image data;

converting a pixel value of a frame constituting the received image data to a first data value based on a predetermined algorithm;

identifying an offset for reducing a number of bits of the first data value based on a range of a converted first data value;

adding the offset to the first data value to obtain a second data value;

obtaining and storing compressed data formed by compressing the second data value; and mapping a number of bits of the second data value and the offset to a non-used index of a header of the compressed data.

* * * * *